Nov. 7, 1950          C. E. JACOBUS          2,528,752

CONTROL LINKAGE MECHANISM

Filed Nov. 7, 1949          2 Sheets-Sheet 1

INVENTOR.
CLARENCE E. JACOBUS
BY Reynolds & Beach
ATTORNEYS

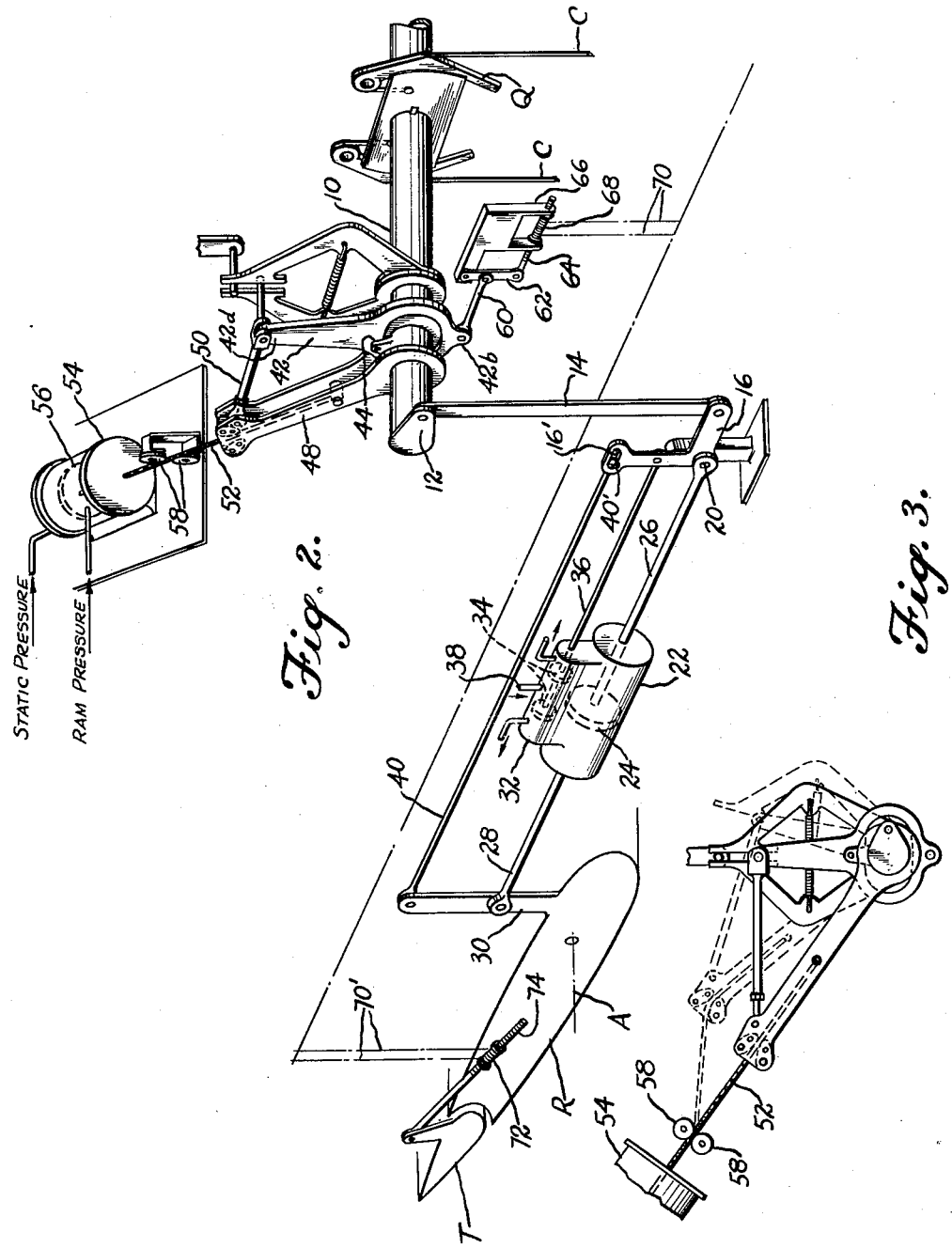

Patented Nov. 7, 1950

2,528,752

UNITED STATES PATENT OFFICE 2,528,752

CONTROL LINKAGE MECHANISM

Clarence E. Jacobus, Kent, Wash., assignor to Boeing Airplane Company, Seattle, Wash., a corporation of Delaware Application November 7, 1949, Serial No. 126,013

8 Claims. (Cl. 74—469)

This invention relates to control linkage mechanisms, and more particularly to those of a type wherein a first control element is influenced or, depending upon the application, exerts influence, at a rate or to a degree determined in accordance with the combined influences, independent in origin, of second and third control elements coordinated therewith.

The preferred and herein illustrated application of the control linkage mechanism exists in conjunction with aircraft pilot-controlled booster or servo systems used for establishing and varying the position of the rudder or other variable airfoil surface. The value of booster control, apart from its convenience for automatic pilot operation, especially in large aircraft, lies in sparing the pilot from the heavy physical strain entailed in matching the large control reaction forces resulting from airstream impact upon the variable airfoil surface. While such force isolation greatly eases the physical strain upon the pilot, however, it has the disadvantage of depriving him of the familiar "feel" of direct control, so that he cannot sense, by means of reaction force upon the controller, the prevailing position of the controlled airfoil surface.

With that problem in mind, the control linkage mechanism provided by the present invention is particularly useful in simulating upon the pilot's controller a force variation substantially equivalent to the natural force reaction or variation accompanying direct control, but at a much smaller scale or magnitude so that the pilot's strength is not taxed. It will be understood, however, that the invention resides primarily in the control linkage mechanism by which the illustrative objective is carried out and that the mechanism broadly has various other applications as well.

A primary object of the invention is to devise a mechanism of the type and for the purpose indicated which meets the well known stringent basic requirements for all modern aircraft applications, namely lightness of weight, compactness, reliability and safety.

A further object of the invention is to devise such a mechanism which is adapted, in the illustrated case, to simulate, at reduced scale, upon the pilot's controller, a force variation which represents not merely the reaction from the air stream force upon the main variable control surface, such as the rudder, but the resultant of this force combined with that acting upon an adjustable trim tab of such main control surface. The object is to attain, as nearly as need be, simulation of the true force reaction conditions of direct control, by simple mechanism which is effective and compact.

Still another object of the invention is to provide means in such control linkage mechanism for restoring the same to neutral position when not positioned otherwise by act of the pilot, whereby, as a result, both the pilot's controller and the booster-actuated control surface enslaved thereto are likewise returned to the neutral.

A related object is to provide a predetermined minimum, finite but nonetheless detectable, force variation upon the pilot's controller in proportion to angular displacement of such controller, hence of the control surface, when the airplane is grounded. When the airplane is in flight, however, such a constant minimum controller reaction force variation is merged in and subordinated to the larger simulated control reaction force variations which, for particular controller settings, are caused to vary directly with airspeed.

Briefly described, the novel control linkage mechanism in its preferred and herein illustrated form comprises in combination with a main control or torque shaft rotated by or with the pilot's controller, to establish rudder position, a coordinating link disposed generally perpendicular to the shaft's axis, and a crank arm carried for rotation by said torque shaft and pivotally connected at its swinging end to the coordinating link generally intermediate the latter's ends. Preferably in the normal or neutral position of the mechanism, corresponding to zero deflection of the rudder and tab, crank arm and coordinating link are similarly oriented in rotation angle relative to the shaft's axis, and the latter intersects the link between the crank arm connection thereto and one end referred to as the base end, of such link. Such base end has a pivotal support which can be shifted in a direction, defined as generally transverse to the link and to the shaft axis, in accordance with rudder tab adjustments. The opposite end of the coordinating link, referred to as its load end, is pivotally interconnected by a second link to a generally radial, force-proportioning arm, to define a linkage triangle, such arm being freely pivoted preferably on the torque shaft itself.

In the illustrated case there are two control influences which produce swinging of the linkage triangle, hence of the proportioning arm, out of the normal or neutral position; one is swinging of the crank arm by torque shaft rotation, effecting rudder adjustments which produces swinging of the coordinating link about its base end, and the second is swinging of the coordinating link about its intermediate pivot connection to the crank arm by shifting the base end of the coordinating link in accordance with trim tab adjustments.

A force proportional to airspeed is generated by suitable means hereinafter described, and applied to the proportioning arm in a direction relative thereto which changes progressively from the radial toward the circumferential as the linkage triangle, hence the arm, is swung correspondingly from rudder neutral, either to rudder-right or to rudder-left equivalent positions. Thus the proportioning arm, through the second link, applies to the load end of the coordinating link a variable proportion of the force determined by air speed, which proportion depends upon the coordinating link's own position and, through the crank arm, produces simulated control reaction torque at a small scale on the torque shaft. This is sensed by the pilot on the controller.

A further feature of the control linkage mechanism resides in the provision of spring-return means for recentering or neutralizing the position of the load end of the coordinating link, hence of the proportioning arm, at low or zero airspeed when the pilot releases the controller. Because of a characteristic of the mechanism, when the load end of the coordinating link is thus recentered the boost control is so actuated as to reposition the rudder to the true neutral, but, if not, then to a position which is offset therefrom by an amount which compensates for existing trim tab offset adjustment. The later instance corresponds to an effective aerodynamic neutral of the composite rudder control surface. This result stems from the arrangement of shifting pivots of the coordinating link, one defined by the swinging end of the crank arm, moved with rudder adjustments, and the other defined by the movable base end of the coordinating link, moved with tab adjustments.

These and other features, objects and advantages of the invention will become further apparent from the following detailed description of the preferred form and illustrative use of the control linkage mechanism as shown in the accompanying drawings.

Figure 2 is a schematic diagram of the rudder control system in conjunction with which the linkage mechanism is employed for the purposes described.

Figure 3 is a simplified end view of the control linkage mechanism and associated means for applying airspeed-determined force thereto, the solid line position and the dotted line position corresponding, respectively, to positioning of the rudder at neutral and at one side of neutral.

While the invention is described and illustrated herein as applied to simulating control force reactions of the rudder, it will be obvious that a very similar arrangement is feasible in the case of other control surfaces of the airplane. Moreover, the field of utility of the control linkage mechanism is not necessarily restricted to simulating such or like force variables, that is to the general function of imposing upon a control shaft a selected proportion of a force which proportion varies in accordance with two or more external influences, one representing the shaft's own position, but may also be utilized in parallel cases requiring transformation of a mechanical movement, instead of a force, in accordance with selected external influences. That is, for different applications of the linkage mechanism the proportioning arm may be regarded as a control element which imparts or receives either force or movement at a rate or to a degree dependent upon setting of the coordinating link. It is unnecessary, however, to describe the various uses beyond this brief generalization, because the invention resides primarily in the control linkage mechanism.

Figure 1:
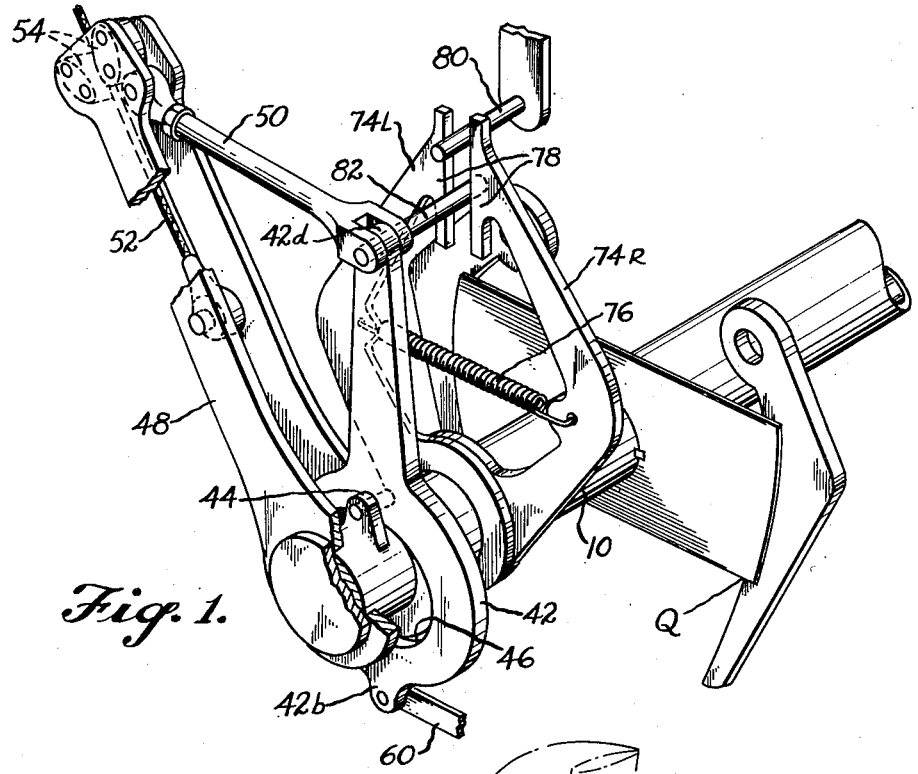
Figure 1 is an isometric view of the control linkage mechanism proper.
Figure 4:
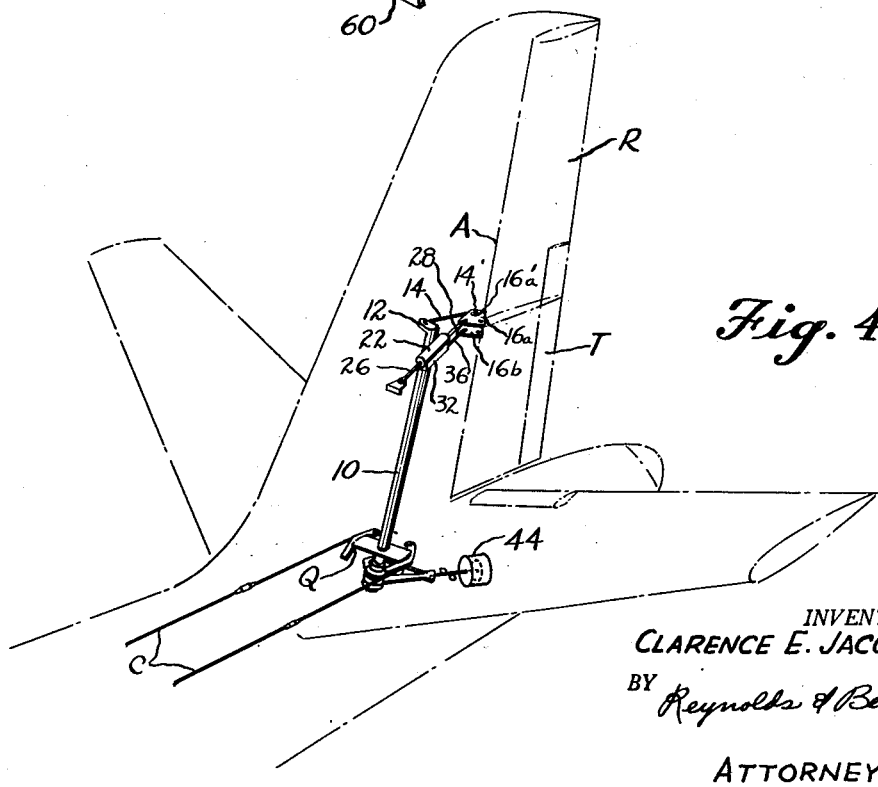
Figure 4 is a perspective outline view of the tail of an airplane in which the compact control linkage mechanism is installed in conjunction with part of the rudder control system.

A conventional hydraulic boost rudder control system is shown in schematic form in Figure 2 and in one practical, although greatly simplified, installed form in Figure 4. The function of such a control system is to swing the rudder R about its upright axis A (shown horizontal in Figure 2, as are certain of the mechanical parts, for convenience in illustration) in response to angular movements of the pilot's control quadrant Q. The control quadrant, preferably mounted in the vicinity of the rudder, is connected by control cables C to the pilot's controller (not shown) in the cockpit. The quadrant is keyed to a control shaft 10 which carries a crank 12. This crank is connected by a link 14 to the boost or servo mechanism which produces rudder movement in accordance with angular movement of shaft 10 and crank 12 resulting from the pilot's manipulation of the rudder controller.

In Figure 2 the boost mechanism includes a bell crank 16 pivoted on a stationary pin 20 and rocked by the link 14 connected to the shaft-mounted crank 12. A hydraulic boost cylinder 22 incloses a piston 24 connected by piston rod 26 to stationary pin 20. The boost cylinder itself is connected by an oppositely extending rod 28 to a lever arm 30 effectively integral with the rudder, to turn the same such that longitudinal movement of the boost cylinder relative to the fixed piston will produce angular adjustment of the rudder R.

Mounted upon the boost cylinder is a boost control valve housing 32. The valve includes suitable control pistons 34 reciprocable longitudinally in the valve housing by a valve rod 36 upon which the control pistons are mounted in spaced relation to register with valve parts (not shown). The rod 36 is pivotally connected at its extreme end to the bell crank 16. Rocking of the crank to one side of the neutral position causes the valve to admit pressure fluid from pipe 38 into one end of the boost cylinder 22 and produce a corresponding relief of pressure in the opposite end thereof, with the result that the boost cylinder moves and the lever arm 30 is swung. If the valve rod is moved oppositely there is a reverse effect on rudder position. Such boost cylinder, hence valve housing, movement progresses until, by follow-up action, the valve housing again reaches the valve-closed position, relative to the valve pistons 34. Because this is a conventional follow-up boost mechanism and control arrangement not a part of the invention, no further detailed description or illustration herein is deemed necessary. Any suitable boost mechanism, whether hydraulic, electric or mechanical, by which the rudder is positioned automatically in accordance with the selected control positioning of a rotatable control member such as the shaft 10, and yet without requiring a corresponding force to be applied by the shaft, would serve as a basis for illustrating the nature and operation of the control linkage mechanism of this invention.

It is customary in rudder control systems to afford direct mechanical control in the event the boost system fails. This is illustrated schematically by the provision of a rod 40 connected by one end to the rudder arm 30 and by its opposite end to the bell crank 16. The latter connection is of the lost-motion type, including a lateral projection on the end of the rod slideably engaging a circumferential slot 16' in the end of the bell crank. Because of the lost-motion connection, only if the hydraulic boost fails to operate will there be a positive mechanical connection between the bell crank 16 and the rudder arm 30.

The equivalent practical form of the rudder control system shown in Figure 4 includes the lower sector plate 16b directly connected by a pin 14' to the control link 14 to be rocked by reciprocation of the link. The boost control valve rod 36 is connected to the sector plate 16b to be reciprocated in accordance with angular movements of the crank 12 transmitted through link 14. A second sector plate 16a combines the functions of the bell crank 16 and the rudder arm 30, being rocked by reciprocation of the boost cylinder rod 28 and in turn swinging the rudder R. The lost-motion connection is provided by engagement of the connecting pin 14' in a circumferential slot 16a' in sector plate 16a for direct mechanical control of the rudder in the event of boost failure.

It will be apparent from the foregoing description of the rudder control system that the pilot is substantially relieved of all physical strain in controlling the rudder, because the shaft 10 is merely a boost control shaft and the rudder control force is actually produced by the hydraulic boost mechanism. At the same time it is apparent, however, that the pilot is no longer able to sense the wind force on the rudder as an indication to him of rudder position. The present linkage control mechanism is utilized in apparatus which simulates at a small scale rudder reaction torque at different air speeds and imposes a corresponding simulated rudder reaction force on the pilot's controller to restore this control sensation to the pilot, still without taxing his strength. In accordance with the invention this result is accomplished without any objectionable increase in space or weight requirements and without interfering in any way with rudder control. The mechanism merely superimposes its effect on the rudder controller.

Since the main illustrated function of the control linkage mechanism and associated apparatus is to apply a variable torque to the control shaft 10, it will be convenient hereinafter to refer to this shaft as the "torque shaft." At the heart of the control linkage mechanism is a coordinating link 42. The torque shaft 10 carries fixedly thereon a crank arm 44 whose swinging end is pivotally connected to the coordinating link 42 in a location generally intermediate to the latter's ends. In the neutral position of the control linkage mechanism the coordinating link and crank arm are preferably co-oriented, and to permit this without interference from the shaft 10 the coordinating link is widened and provided with a large central aperture 46 through which the torque shaft 10 passes. The aperture accommodating the torque shaft is sufficiently large that the link can be swung about its base end 42b, located on the side of the shaft generally opposite the crank 44, transversely of the shaft through a considerable angle by rotation of such crank arm, and likewise can be swung by its base end 42b about its pivotal connection to the crank arm 44 through a considerable angle transversely of the shaft, in either event without premature limitation of movement by contact between the wall of aperture 46 and the side of the torque shaft. Whether the coordinating link 42 is swung about its base end as pivot, or about its intermediate portion connected to the crank arm 44, as pivot, the effect is to swing the opposite or load end 42d of the link in a generally circumferential direction relative to the shaft axis.

Freely pivoted on torque shaft 10 is a force proportioning arm 48 whose upper end is pivotally interconnected, by a second link 50, with the load end 42d of coordinating link 42 to define a linkage triangle. A flexible cable 52 is connected at one end to the proportioning arm 48 and extends from the end of such arm, as between cable-wrap guides 54, to a pneumatic mechanism which is referred to as "Q-spring," which exerts a tension force in the cable directly related to airspeed of the airplane. Such mechanism includes a pneumatic cylinder 54 containing a cooperating piston 56 connected to the end of the cable 52 as shown in Figure 2. Into one end of this cylinder, to produce tension in the cable, air is admitted under pressure established by a scoop or a ram (not shown) which opens directly into and against the airstream. Into the opposite end of the cylinder a reference or static pressure is established.

The cable 2 extends from the piston or a piston rod along the axis of cylinder 54 and passes between the closely spaced guide rollers 58, having suitable fixed supports. These guide rollers lie jointly in the plane of rotation of the proportioning arm 48, so that as the arm is swung about torque shaft 10 and the cable 52 is deflected about one guide roller or the other, depending upon the direction of rotation of such arm, there is no tendency for the cable to slip from between the rollers. The dotted line showing in Figure 3 represents one cable-deflected position of the control linkage mechanism, but it may be deflected oppositely and by varying amounts.

Assuming for the moment that the base end 42b of the coordinating link 42 constitutes a stationary pivot for such link, it will be evident that angular movements of the torque shaft 10 and crank arm 44 produce generally circumferential swinging of the load end 42d of the coordinating link. This changes the angular position of the proportioning arm 48 about the axis of the torque shaft. In the neutral position of the linkage mechanism the proportioning arm is substantially aligned with the axis of pneumatic cylinder 54, the cable 52 being undeflected at the rollers 58. Cable tension then applies no torque to the arm. However, as the proportioning arm is swung by crank 44 out of neutral position (shown by solid lines in Figure 3) and the angle of departure of the cable from alignment with the arm progressively increases, there is a progressively increasing component of cable force applied radially of the arm, opposing such angular movement. This force is transmitted through the link 50 directly to the load end of the coordinating link 42. Such reaction force, therefore, is applied by the coordinating link directly to the crank arm 44 and to the torque shaft 10 whose progressive angular movement produced the increasing force.

As a result, the pilot, in the act of turning the control quadrant Q for moving the rudder through the hydraulic boost, senses a resisting force which increases progressively as the rudder is swung from the neutral position to the right or to the left. The force rate of change sensed by the pilot, originating in the Q spring and transformed by the control linkage mechanism, simulates control reaction forces. Its magnitude for a given operating condition is readily established by design, but is made preferably no greater than necessary to afford the required minimum sensation of control reaction feel to the pilot at the slowest normally expected airspeed, because as airspeed increases the simulated control reaction force imposed on the pilot's controller increases proportionately. In this way excessive or obstructive simulation forces at the highest airspeeds, which would defeat the purpose of the boost, are avoided in order to spare the physical strength of the pilot.

It will be noted that the tension in cable 52 tends to swing proportioning arm 48 into alignment with the axis of the Q-spring cylinder 54. Consequently, should the pilot release the controller by which shaft 10 is rotated, tension in the cable 52 tends to swing the linkage mechanism into rudder neutral position, which, through the boost, tends to re-center the rudder itself.

Of necessity in achieving realistic control force simulation, the control linkage mechanism also embodies means by which changes in the setting of the rudder tab T are utilized, in combination with the effect of rudder adjustments, for producing a corresponding change in simulated control reaction torque applied to torque shaft 10 and sensed by the pilot. This is accomplished by shifting the pivot of the base end 42d of coordinating link 42 in accordance with tab adjustments. A suitable arrangement for this includes the link 60 pivotally interconnecting such base end with a rocking arm 62. The upper end of arm 62 is pivoted on a stationary support and its lower end is swung, in the plane of the link 60, by endwise movement of an actuating screw 64. The screw 64 is guided for longitudinal movement in a suitable guide frame 66 by rotation of a nut 68. The body of the nut is formed as a cable spool or drum upon which a control cable 70 is wound and unwound to rotate the spool as the cable is drawn. A similar spool 72 and actuating screw 74 are driven by a coordinated cable 70' for varying the rudder tab setting. The arrangement is shown only schematically and is such that the pivotal connection at the base end 42d of coordinating link 42 is shifted in position in accordance with changes in rudder tab position.

If the pilot's controller, hence shaft 10 and crank arm 44, is held stationary as rudder tab position is varied by the pilot operating suitable controls for coordinated cables 70 and 70', the coordinating link 42 is swung about its intermediate pivotal connection to the crank arm 44. This effects a corresponding change in position of the proportioning arm 48 and results in a different force reaction upon the crank arm 44 and torque shaft 10, sensed by the pilot. The moment-arms and the force and displacement relationships between the different members in the linkage mechanism are such that any such change in tab setting produces a simulated control reaction force, sensed by the pilot, at a magnitude or rate which corresponds in its proper relation to the simulated force reactions produced for changes in rudder position. In other words, the mechanism simulates at small scale the true composite of control force reactions, as to changes both in rudder position and tab setting, separately or combined in any attainable ratio.

As to incidents of combining these two effects, it will be noted that if the proportioning arm 48 is in position corresponding to neutral, namely, aligned with cable 52, the pilot senses no force in the controller. At the same time, however, it is entirely possible that the rudder itself will be displaced from neutral position because it may be that there is an equivalent or balancing opposite displacement of the trim tab. Nevertheless, this constitutes an effective neutral. Therefore the pilot senses not only true neutral of both rudder and tab, but also the effective neutral. In terms of linkage operation, while the load end 42d of coordinating link 42 is in neutral or zero-torque position, the respective shifting pivotal connections of the coordinating link, namely to the crank arm 44 and to the link 60, are oppositely displaced from their zero or neutral positions by effectively equal offsetting amounts.

In order to return the control linkage mechanism hence the torque shaft 10 and the pilot's controller to neutral position at very low or zero air speeds when the controller is released by the pilot and also, thereby, to return the rudder to the effective neutral position at such times, the control linkage mechanism further includes centering spring means. Such a means preferably comprises the L-shaped arms 74R and 74L, pivoted independently on torque shaft 10 and urged mutually together by a spring 76 interconnecting them. The outer ends of these arms carry similar abutments 78 which normally bear against opposite sides of a fixed stop comprising a stud 80. This stud centers the arms at a position corresponding to the neutral. The load end 42d of coordinating link 42 carries a stud 82 which projects transversely of the link into the space between the respective arm abutments 78, parallel to the stud 80.

In the neutral position of the linkage mechanism both abutments 78 contact the opposite sides of both studs. However, if the coordinating link is rotated by crank 44 in the direction corresponding to rudder-to-right, for instance, the arm 74R is moved away from the stud 80 by swinging of the stud 82. Since the other arm, 74L, remains in contact with the stationary stud 80 at this time, spring 76 progressively stretches as the arm 74R is rotated. Therefore at a time when the airplane is stationary, the resultant increasing spring force reacting upon the coordinating link, hence upon the crank arm 44 and torque shaft 10, gives the pilot at least a slight force sensation representing variations in rudder position, although such a sensation is much less pronounced than that afforded when the airplane is traveling through the air at appreciable speed and the Q-spring is acting through the cable 52 and linkage mechanism to stimulate rudder control forces.

The spring 76 returns the displaced arm 74R or 74L to neutral position, carrying with it the stud 82 hence the coordinating link and the torque shaft 10 when the pilot does not resist or determine otherwise. This restores neutral position of the boost cylinder control valve and effective neutral position of the rudder. Such neutral position will be the true neutral position if the trim tab T is aligned with the rudder, or an effective neutral position if not so aligned.

The control linkage mechanism thus described is compact, the parts being largely coaxial and closely grouped together along shaft 10. Moreover, despite its simplicity it accomplishes rather complex operations effectively and with substantial accuracy. It is well suited, therefore, to aircraft uses as well as other uses.

I claim as my invention:

1. In combination with a rotatable member, control linkage mechanism comprising a coordinating link disposed generally at right angles to the rotational axis of said rotatable member and having a base end and an opposite load end located generally at opposite sides of such axis, crank means carried for rotation by said rotatable member and connected pivotally to said coordinating link at a location generally intermediate the latter's ends on the side of said axis generally opposite said base end of the link, to define a first pivot for said coordinating link shiftable by rotation of said crank means with said rotatable member in accordance with a first selected quantity variation, independent shifting pivot means connected to the base end of the coordinating link, means for shifting said latter pivot means to rock said coordinating link about its first shifting pivot in accordance with a second selected quantity variation, a proportioning arm pivoted for swinging about an axis generally in the vicinity of and parallel to said rotatable member's axis, link means pivotally interconnecting the load end of said coordinating link and the swinging end of said proportioning arm to define a linkage triangle, and means transmitting a third quantity variation and connected to said proportioning arm for coordination of such third quantity variation with the first and second quantity variations through the medium of said linkage triangle and coordinating link.

2. The combination defined in claim 1 wherein the control linkage mechanism has a neutral position in which the three pivotal connections of the coordinating link all lie substantially in a plane containing the axis of the rotatable member, such mechanism further comprising spring means reacting from a stationary support upon the linkage triangle for urging the same toward such neutral position from rotated positions on either side thereof.

3. The combination defined in claim 2 wherein the spring means comprises a pair of members each pivoted independently about an axis generally parallel to the rotatable member's axis, a spring interconnecting said members tending to urge them mutually together, a fixed abutment interposed between said members to define a stop position of such members contacting opposite sides of said fixed abutment, corresponding to neutral position of the linkage triangle, and a second abutment carried by the load end of the coordinating link to project between said members, whereby such load end of the coordinating link is normally maintained in neutral position but may be swung therefrom in either direction against the force of said spring by swinging of one or the other of said members away from said stop abutment.

4. In combination with a rotatable torque reaction member, control linkage mechanism comprising a coordinating link disposed generally at right angles to the rotational axis of said rotatable member and having a base end and an opposite load end located generally at opposite sides of such axis, crank means carried for rotation by said rotatable member and connected pivotally to said coordinating link at a location generally intermediate the latter's ends on the side of said axis generally opposite said base end of the link, to define a first pivot for said coordinating link, shiftable by rotation of said crank means with said rotatable member in accordance with a first selected quantity variation, independent shifting pivot means connected to the base end of the coordinating link, means for shifting said latter pivot means to rock said coordinating link about its first shifting pivot in accordance with a second selected quantity variation, a force proportioning arm pivoted for swinging about an axis generally in the vicinity of and parallel to said rotatable member's axis, link means pivotally interconnecting the load end of said coordinating link and the swinging end of said proportioning arm to define a linkage triangle, and means connected to said proportioning arm and applying a force thereto at an angle to such arm which varies progressively with rotation thereof, such force resulting in torque upon said coordinating link and upon said crank arm, and thereby said rotatable torque reaction member, in accordance with the coordinated positionings of said first and second shifting pivots together establishing the rotated position of said proportioning arm.

5. The combination defined in claim 4 wherein the force applying means connected to the proportioning arm comprises a cable extending under tension through fixed guide means to the arm, tending to align such arm, the cable and such guide means, and yieldable means exerting tension on such cable.

6. The combination defined in claim 5 wherein the control linkage mechanism has a neutral position corresponding to alignment of the tension cable and arm, in which the three pivotal connections of the coordinating link all lie substantially in a plane containing the axis of the rotatable member, and spring means comprising a pair of members each pivoted independently about an axis generally parallel to the rotatable member's axis, a spring interconnecting said members tending to urge them mutually together, a fixed abutment interposed between said members to define a stop position of such members contacting opposite sides of said fixed abutment, corresponding to neutral position of the linkage mechanism, and a second abutment carried by the load end of the coordinating link to project between said members, whereby such load end of the coordinating link is normally maintained in neutral position but may be swung therefrom in either direction against the force of said spring by swinging of one or the other of said members away from said stop abutment.

7. In combination with a control shaft rotatable in accordance with a primary control function, linkage mechanism operable to impart to said shaft a reaction torque variable in accordance with a combination of said primary control function, an independent secondary control function and an independent force variable, such mechanism comprising a coordinating link disposed generally transversely of said shaft and having a load end located generally on one side thereof and an opposite base end located on the opposite side of such shaft, such ends of the coordinating link normally lying substantially in a plane containing the shaft's axis, a crank arm mounted for rotation by said shaft closely adjacent to said coordinating link and connected pivotally to such link at a location generally intermediate the latter's ends, at a location between the load end thereof and the shaft axis, such crank and link connection defining a link pivot shiftable by shaft rotation in accordance with said primary control function, means pivotally connected to the base end of said coordinating link and shiftable to rock said coordinating link about its crank connection in accordance with said secondary control function, a force proportioning arm freely pivotable on said shaft at a location closely adjacent to said coordinating link, link means pivotally interconnecting the swinging end of said proportioning arm and the load end of said coordinating link to define a linkage triangle, means operable to apply torque to said proportioning arm related to said independent force variable and increasing progressively in accordance with angular rotation of such arm from a selected neutral position corresponding substantially to a position of said linkage triangle wherein the coordinating link's three pivotal connections lie substantially in a plane containing the shaft's axis, such progressive torque increase resulting in corresponding progressive torque increase on said shaft, back through the linkage triangle and crank arm, and spring-return means tending to urge said linkage triangle toward neutral position in either direction of rotation thereof generally about said shaft.

8. The combination defined in claim 7 wherein the spring-return means comprises a pair of members each pivoted independently about an axis generally parallel to the shaft's axis, a spring interconnecting said members tending to urge them mutually together, a fixed abutment interposed between said members to define a stop position of such members contacting opposite sides of said fixed abutment, corresponding to neutral position of the linkage triangle, and a second abutment carried by the load end of the coordinating link to project between said members, whereby such load end of the coordinating link is normally maintained in neutral position but may be swung therefrom in either direction against the force of said spring by swinging of one or the other of said members away from said stop abutment.

CLARENCE E. JACOBUS.

REFERENCES CITED

The following references are of record in the file of this patent:

UNITED STATES PATENTS

| Number | Name | Date |
| --- | --- | --- |
| 2,445,343 | Tyra | July 20, 1948 |